United States Patent Office 3,305,328
Patented Feb. 21, 1967

3,305,328
COMPOSITE CLAD STEEL PRODUCT
Charles David Pugh, Birmingham, Ala., assignor to Chicago Bridge & Iron Company, Hinsdale, Ill., a corporation of Illinois
No Drawing. Original application Oct. 7, 1963, Ser. No. 314,551, now Patent No. 3,222,164, dated Dec. 7, 1965. Divided and this application Aug. 24, 1965, Ser. No. 482,293
3 Claims. (Cl. 29—196.6)

This application is a divisional of my copending application Serial No. 314,551 filed October 7, 1963, now U.S. Patent No. 3,222,164, which is a continuation-in-part of my application Serial No. 256,259 filed February 5, 1963, now abandoned.

This application relates to the art of brazing two metal pieces together. More particularly, this invention is concerned with a new alloy which when used in brazing gives new and novel brazed products.

Although the art of brazing has been practiced many years, its usefulness continues to increase. Currently, brazing is employed in various processes of bonding or joining metals together but it is particularly useful in the production of composite clad products in which a base plate is clad with a corrosive resistant plate by means of an intermediate brazing alloy. In such composite clad products a cladding plate is used which is resistant to the conditions which it will face in operation. Some of the materials used for making clad products are copper, silver, titanium and, of course, stainless steels of various compositions as well as nickel and nickel-base alloys.

One particularly useful process for making clad products is shown in Brown, U.S. Patent 2,713,196. There it is shown that a cladding plate may be bonded to a base plate with a brazing material placed between the plates by means of a vacuum drawn between the plates so that oxygen and gases released are eliminated during heating and brazing of the plates. The vacuum not only serves to remove deleterious gases but the lower pressure between the plates permits the atmosphere to press the base plate and the cladding plate together into intimate and uniform contact during the brazing operation and thereby eliminate any need for other means of pressing the plates together. The actual brazing is, of course, effected at temperatures which melt the brazing material while the vacuum is maintained between the base plate and the cladding plate as is fully shown in the said Brown patent.

In many cladding operations it is not essential that the vacuum employed by Brown be used since acceptable plates are sometimes obtained without the vacuum although they generally do not possess anywhere near the shear strength of clad plates produced according to the vacuum cladding process of Brown.

One of the brazing alloys used successfully in the past in bonding stainless steel, nickel and nickel-base cladding plates to base plates is comprised of only manganese and nickel in various ratios except for impurities. Such brazing alloys generally contain from about 28 to 63% nickel with the remainder being manganese. However, these manganese-nickel brazing alloys are subject to embrittlement at elevated temperatures. Silver base brazing alloys and copper base brazing alloys are not subject to embrittlement, however, stainless clad plates produced with these alloys are not weldable by conventional methods and, thus, these alloys have limited usefulness. While clads bonded with most nickel base brazing alloys can be welded by conventional methods, the brazing alloys contain melting point depressants which render the alloy unrollable into foil.

It has now been discovered according to the present invention that by use of a novel brazing alloy composed of manganese and nickel and containing small amounts of silicon and copper, a cladding plate can be bonded successfully to a base plate and the resulting composite clad product can be soaked at elevated temperatures or subjected to repeated temperature cycles of great magnitude such as up and down from about ambient temperature to about 1000° F. without the formation of an embrittling phase in the bond.

The novel brazing alloy which can be used in the formation of such improved composite cladding products is comprised of a ratio by weight of nickel to manganese which is in the range of 2.12 to about 3.0, has a silicon content which is approximately in the range of about 0.25 to 1.8% by weight and a small amount of copper up to about 20%, and generally at least 1%, by weight of the alloy. Generally, alloys of this composition are particularly useful in bonding stainless steel, nickel and nickel-base cladding plates to suitable ferrous base plates because they do not form an undesirable embrittling phase in the bond after holding at elevated temperatures or by repeated cycling of the composite clad products, and because the resulting clad plates are readily weldable by conventional methods.

Representative of the stainless steel cladding plates which can be clad to the base plates using the novel brazing alloys herein described are stainless steel types 304, 316, 405, 410 and 430, and nickel-base cladding plates such as Hastelloy "B" containing about 26 to 30% molybdenum, about 7% iron, 0.12% maximum carbon, with the balance nickel, Hastelloy "C" containing about 13 to 16% chromium, 15 to 19% molybdenum, 3.5 to 5.5% tungsten, 4 to 7% iron, 52 to 54% nickel and a maximum of 0.15% carbon, cladding plates made of alloys sold under the trade marks "Inconel" and "Monel," as well as other types of iron and steel plates such as the chromium steels and chromium-nickel steels. The alloys can, of course, be used for bonding nickel to ferrous base plates.

Silicon contents of greater than 1.8% are not considered desirable because composites brazed with such alloys result in the formation of bonds which are considerably less ductile. Generally, about 0.5 to 1.5% by weight of silicon is most suitable.

The range of copper usually will be from 2 to about 15% by weight of the alloy, with from about 5 to 15% by weight generally being most acceptable. The copper lowers the melting point of the resulting alloy, increases fluidity and wettability and also makes it even more suitable for rolling into foil by increasing ductility.

Such an alloy, in addition to being rollable into foil, also leads to a clad product which is highly useful in fabricating objects such as vessels because it is still weldable by conventional methods. Furthermore, clad products made with the copper containing alloy can be soaked at high temperatures for long periods, or can be cycled from ambient temperature to high temperatures, without any deleterious effects.

Some of the specific four component alloys which can be used satisfactorily in bonding stainless steel, nickel and nickel-base alloys, as well as various grades of iron and steel plates, to ferrous base plates can have the following compositions:

| Ni | Mn | Cu | Si |
|---|---|---|---|
| 63.75 | 27.5 | 7.5 | 1.25 |
| 65.5 | 28.0 | 5.0 | 1.5 |
| 65.0 | 28.7 | 5.0 | 1.3 |
| 61.7 | 25.1 | 11.95 | 1.25 |
| 60.0 | 24.4 | 14.55 | 1.05 |
| 54.8 | 23.8 | 20.54 | 0.87 |

The brazing alloys provided by this invention can be produced by bringing all the components together at a temperature which produces a molten alloy. After the molten alloy is formed it can be cast into ingots of any suitable size for subsequent conversion into forms suitable for brazing use, such as wire, screen and foil.

According to a further aspect of this invention, it has been found highly advantageous to homogenize the alloy ingots when they contain at least 1.3%, and up to 1.8%, silicon before they are converted by hot or cold reduction means into forms suitable for use in brazing. When the silicon content is lower than 1.3% homogenizing can be employed but is generally unnecessary when hot rolled. By "homogenizing" is meant a heat treating process carried out at a temperature which eliminates or decreases chemical segregation by diffusion. Homogenization of the ingots substantially eliminates hard phases which are sometimes otherwise present in the ingot and leads to a more uniform crystal structure. Ingots which are homogenized can be readily drawn into wire and rolled hot or cold into foil. With homogenization, the ingots must usually be hot rolled to produce a foil.

Homogenization of the ingots can be conveniently effected at an elevated temperature below the melting point of the alloy, and desirably in the range of 1600 to 1800° F. The time required for homogenization at such temperatures depends on the temperature used. The lower temperatures require longer heating times than the higher temperatures.

The following examples are presented to illustrate the invention:

*Example 1*

The vacuum brazing process of Brown U.S. Patent 2,713,196 was employed to bond a type 304 stainless steel sheet of 0.109 in. thickness to a carbon steel base plate of 0.5 in. thickness using a brazing alloy composed of 65% nickel, 28.5% manganese, 5% copper and 1.5% silicon. The melting point of the brazing alloy used was approximately 2060° F. The overall dimensions of the brazing sandwich were 17 in. by 17 in. The bonding was effected in a sandwich under vacuum using a bonding temperature of 2125° F. After reaching the bonding temperature, the brazing sandwich was permitted to soak at that temperature for 20 minutes. Then the brazing sandwich was brought to 1700° F., air cooled and then reheated to 1700° F. for normalizing. All through the heating and brazing procedure a vacuum of approximately 29 in. of mercury was maintained in the brazing sandwich and this vacuum was maintained during normalizing. The sandwich was then removed from the furnace, cooled to ambient temperature and opened to obtain the composite clad plate.

A three month soak at 1000° F. and 1200° F. had no adverse effects on the shear strength of the bond.

The composite clad product was successfully welded without any difficulties.

The shear strength measurements of the clad product taken periodically during cycling temperatures showed that at no time did the shear strength go below about 30,000 p.s.i.

*Example 2*

The procedure of Example 1 was followed but the brazing alloy had a composition of 65% nickel, 29% manganese, 5% copper and 1% silicon.

The resulting composite clad product had an average shear strength of 31,700 p.s.i.

*Example 3*

The vacuum brazing process of Brown U.S. Patent 2,713,196 was employed, using the double sandwich arrangement of FIG. 10 of Brown, to bond type 304 stainless steel plates of 0.135 in. thickness to carbon steel base plates of 0.5 in. thickness using two different brazing alloy foils of 0.0048 in. thickness composed of (a) 63.23% nickel, 27.31% manganese, 7.10% copper, and 1.36% silicon and (b) 66.36% nickel, 27.55% manganese, 4.46% copper, and 1.67% silicon. The overall dimensions of the brazing sandwich were 16½" x 26½". The bonding was effected under vacuum using a bonding temperature of 2125° F. After reaching the bonding temperature, the brazing sandwich was permitted to soak at that temperature for 35 minutes. The brazing sandwich was brought to 1700° F., air cooled, then reheated to 1675° F. for normalizing. All through the heating and brazing procedure a vacuum of approximately 29 in. of mercury was maintained in the brazing sandwich and this vacuum was maintained during normalizing. The sandwich was then removed from the furnace, cooled to ambient temperature and opened to obtain the composite clad plates.

The clad was subjected to one month soaks at 600° F., 800° F., 1000° F. and 1200° F. Periodic shear strength measurements taken during the soak tests showed that at no time did the shear strength go below 30,000 p.s.i.

The composite clad products were successfully welded by conventional methods without any difficulties.

*Example 4*

The procedure of Example 3 was followed but 0.110 in. 405 stainless steel was substituted for the 304 stainless steel.

Identical tests were made on these composites as were made in Example 3 and the results were essentially the same.

*Example 5*

A casting was made of an alloy containing 64% nickel, 27.5% manganese, 7.5% copper and 1.0% silicon. Two pieces were taken from the casting as follows:

(a)    0.313 in. x 0.6 in. x 1.25 in.
(b)    0.580 in. x 1.0 in. x 1.0 in.

Piece (a) was not homogenized. In attempting to roll this piece into a foil it cracked when attempting to cold roll it from 0.313 in. to 0.270 in.

Piece (b) was homogenized at 1600° F. for 12 hours. It was cold rolled from 0.580 in. to 0.011 in. foil without cracking.

*Example 6*

Brazing alloys were prepared having the following compositions:

| Ni | Mn | Cu | Si |
| --- | --- | --- | --- |
| 61.7 | 25.1 | 11.95 | 1.25 |
| 60.0 | 24.4 | 14.55 | 1.05 |
| 54.8 | 23.8 | 20.54 | 0.87 |

The alloys were prepared in a small Lindberg furnace and made into castings. The castings were then rolled into foil of 0.008–0.011 inch thickness.

Each alloy in foil form was used to bond a ⅛ inch thick type 304L stainless steel to a ½ inch thick A285C carbon steel base plate using the vacuum cladding process essentially as described in Example 1. The resulting shear strengths of the clads were between 38,000 and 45,000 p.s.i. In bend tests, the clads held up without failure. The clad plates were easily welded by conventional methods.

Various changes and modifications of the invention can be made and, to the extent that such variations incorporate the spirit of this invention, they are intended to be included within the scope of the appended claims.

What is claimed is:

1. A composite clad product in which a carbon steel base plate is clad with a member of the group consisting of stainless steel, nickel and nickel-base cladding plates and the cladding plate is bonded to the base plate by an alloy composed of nickel, manganese, copper and silicon in which the ratio of nickel to manganese by weight is in the range of about 2.12 to about 3.0 parts of nickel per part of manganese, the copper is present in a significant small amount up to about 20% by weight, and with the silicon content being a significant small amount up to about 1.8% by weight.

2. A composite clad product according to claim 1 in which the silicon in the alloy is in the range from 0.25 to 1.5% by weight.

3. A composite clad product according to claim 1 in which the silicon in the alloy is present in the range of about 0.5 to 1.5% by weight and the copper in the alloy is in the range of about 5 to 15% by weight.

References Cited by the Examiner

UNITED STATES PATENTS

| | | | |
|---|---|---|---|
| 2,147,407 | 2/1939 | Huston | 29—196.6 X |
| 2,713,196 | 7/1955 | Brown | 29—196.1 X |
| 2,735,170 | 2/1956 | Moffatt | 29—196.2 |
| 2,975,513 | 3/1961 | Chyle | 29—196.6 X |
| 3,088,192 | 5/1963 | Turner | 29—194 X |

HYLAND BIZOT, *Primary Examiner.*